May 26, 1964 V. S. TIDD 3,134,519
COMBINATION PRESSURE SEAL GROMMET AND DISCHARGE TUBE FOR SPRAYERS
Filed Feb. 17, 1961 2 Sheets-Sheet 1
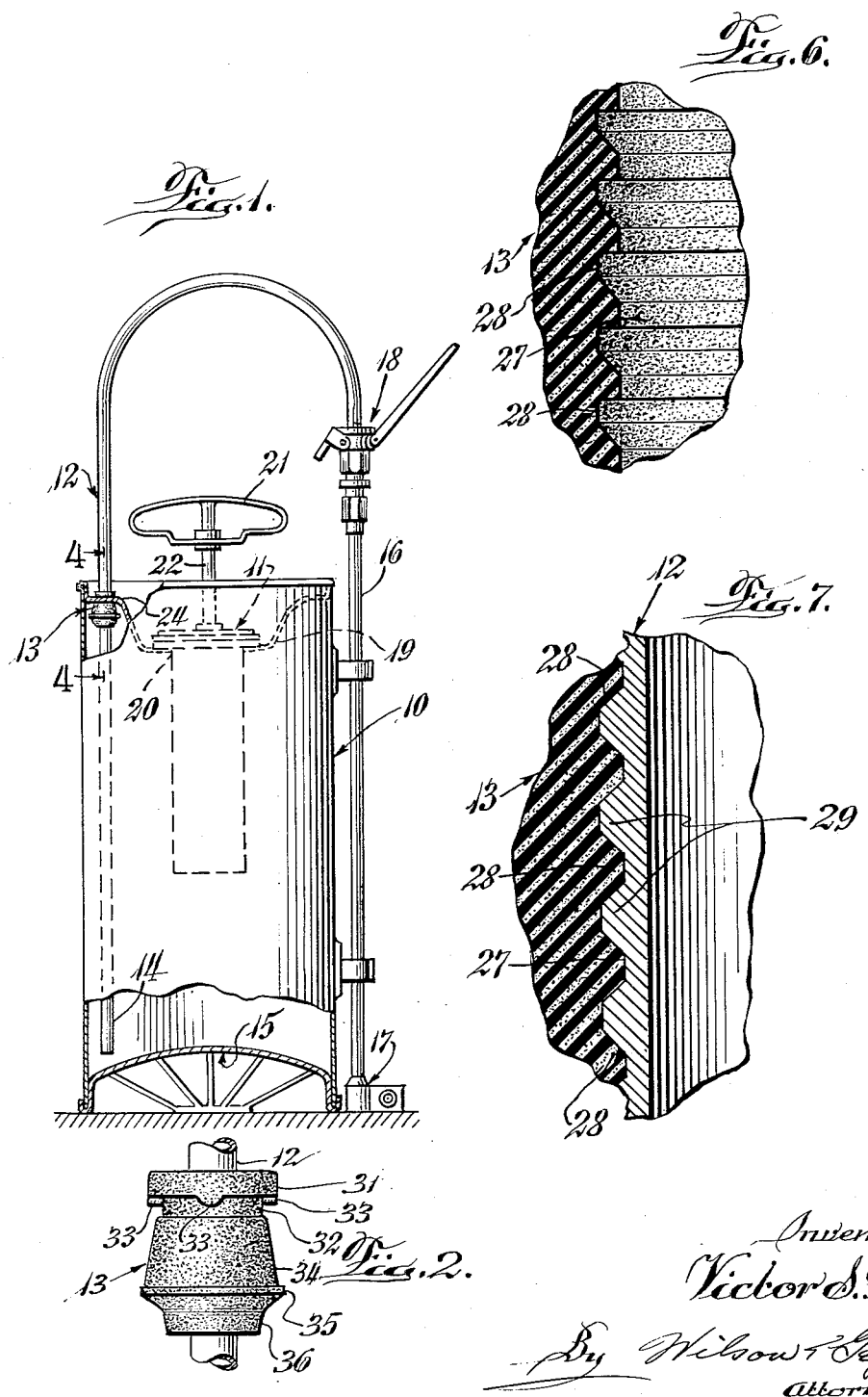
Inventor:
Victor S. Tidd
By Wilson & Geppert
Attorneys.

May 26, 1964 V. S. TIDD 3,134,519
COMBINATION PRESSURE SEAL GROMMET AND DISCHARGE TUBE FOR SPRAYERS
Filed Feb. 17, 1961 2 Sheets-Sheet 2
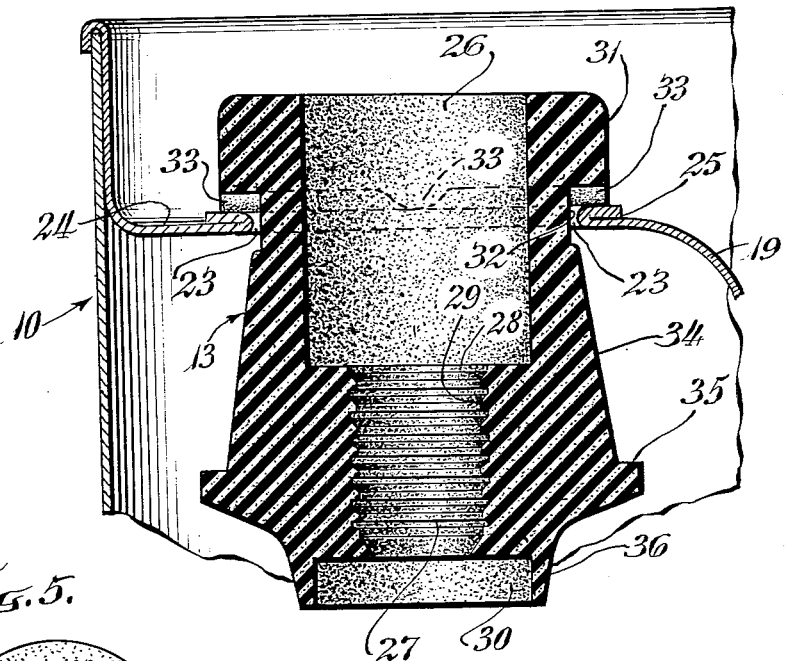
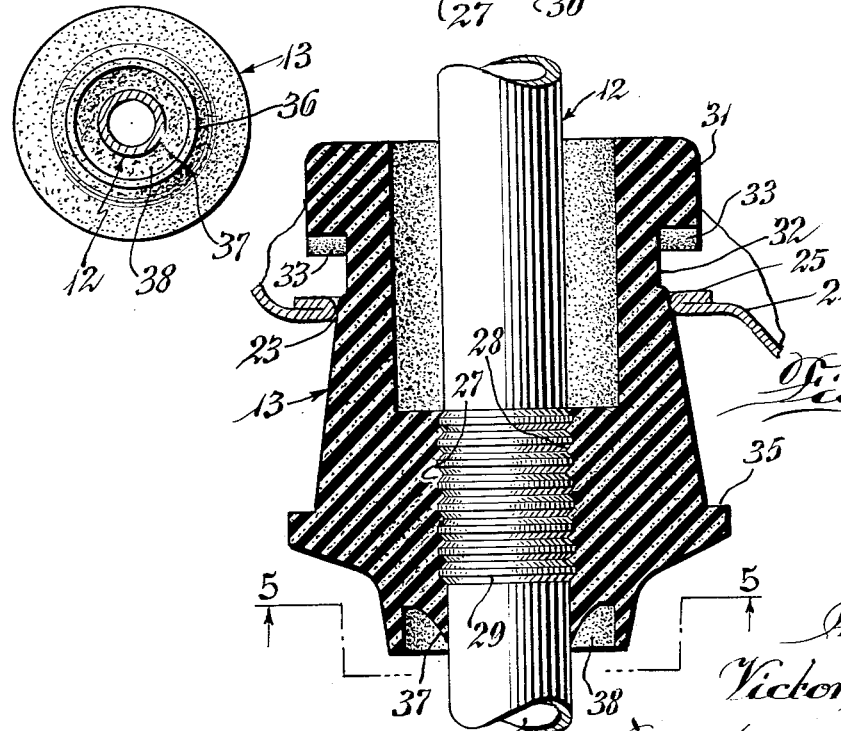
Inventor:
Victor S. Tidd
By Wilson & Geppert
Attorneys.

United States Patent Office 3,134,519
Patented May 26, 1964

3,134,519
COMBINATION PRESSURE SEAL GROMMET AND DISCHARGE TUBE FOR SPRAYERS
Victor S. Tidd, Lowell, Mich., assignor to Root-Lowell Manufacturing Co., Lowell, Mich., a corporation of Ohio
Filed Feb. 17, 1961, Ser. No. 90,123
4 Claims. (Cl. 222—397)

The present invention relates to sprayers for spraying insecticides, pesticides, agricultural chemicals, whitewash, paints and other sprayable solutions contained in a tank and discharged under pressure generated in the tank, and especially to the combination of a novel pressure seal grommet and a novel flexible discharge tube so constructed and arranged as to effectively seal against leakage of air between the tube, grommet and an opening in the tank in which the grommet is mounted and through which the discharge tube projects into the tank.

Among the objects of the present invention is the provision of a novel means and manner of positively sealing a flexible discharge tube in an opening in a pressure tank through which tube the contents of the tank are dispensed.

It is a further important object of the present invention to provide a novel pressure seal grommet having internal serrations intermeshing with serrations formed on the exterior of a discharge tube for effecting a positive inner seal between this tube and the encompassing grommet and such positive sealing maintained under the influence of air pressure in the tank.

The present invention further comprehends a novel pressure sealing grommet mounted within an opening in the upper portion of a pressure tank and a discharge tube projecting through the grommet and into the tank through which tube liquid in the tank is discharged under pressure, the sealing grommet and encompassed sealing tube having interengaging and interlocking surfaces for effecting positive sealing contact between the grommet and the tube and thereby assuring retention of the tube in operative relation and against leakage of pressure from the tank about the tube.

The novel pressure sealing grommet not only provides a positive inner seal enhanced by air pressure in the tank, but also the exterior of the grommet is so constructed and contoured whereby the grommet is bodily lifted by the air pressure and projected and held in positive sealing contact between it and the encompassing flange defining the opening in which it is mounted.

When the novel grommet and discharge tube are assembled and located in operative relation as disclosed and the contents of the tank and the grommet are subjected to internal pressure in the tank, the grommet effects and maintains positive sealing at its inner and outer peripheries. Furthermore, by depressing the exposed upper portion of the grommet, its sealing engagement with the tank is broken whereby pressure within the tank may be quickly and simply relieved and also any remaining liquid in the tank may be drained through the opening receiving the grommet.

Further objects are to provide a construction of maximum simplicity, efficiency, economy and ease of assembly and operation, and such further objects, advantages and capabilities as will later more fully appear and are inherently possessed thereby.

The present invention relates to an improvement in the pressure seal grommet and discharge tube of my copending application Serial No. 65,403, filed October 27, 1960.

In the drawings:
FIGURE 1 is a side elevational view of a compression sprayer with an upper portion of the tank broken away to disclose the novel pressure seal grommet through which projects the discharge tube depending into the tank.

FIG. 2 is an enlarged view in side elevation of the flexible grommet encompassing the discharge tube.

FIG. 3 is a further enlarged view in vertical cross section through the grommet shown mounted in the head of the tank.

FIG. 4 is a view similar to FIG. 3 taken on the line 4—4 of FIG. 1 but with the discharge tube anchored in sealing engagement in the grommet.

FIG. 5 is a bottom plan view of the grommet, the view being taken on the line 5—5 of FIG. 4 but on a reduced scale.

FIG. 6 is a fragmentary enlarged vertical cross sectional view through a portion of the inner bore of the grommet disclosing the formation of its inner serrations.

FIG. 7 is a fragmentary enlarged vertical cross sectional view through a portion of the grommet and discharge tube and showing the manner of intermeshing of the serrations on the grommet and discharge tube to effect and maintain tight sealing contact therebetween under air pressure in the tank.

Referring to the disclosure in the drawings wherein is shown an illustrative embodiment of a compression sprayer comprising a tank or container 10 for receiving a quantity of a spray solution to be dispensed under air pressure generated by a pump assembly 11 through a flexible discharge tube or hose 12 projecting through a resilient pressure seal grommet 13 into the tank 10. This discharge tube 12 which is preferably of a suitable length of a suitable plastic composition and capable of bending without fracture has its lower open end 14 projecting to adjacent the lower portion or one side of the convex base 15 of the tank 10 for assuring withdrawal of the spray solution from the bottom of tank.

The spray solution is discharged under pressure through the flexible hose 12 into a rigid extension tube 16 to the outer or discharge end of which is affixed an adjustable spray nozzle 17 with the discharge therefrom controlled by means of a manually-operated valve assembly 18.

The tank 10 is shown provided with a dished or concaved head 19 in the lower portion of which is provided a fill opening 20 in which the pump assembly 11 is removably mounted for filling the tank with spray solution or for draining the tank when the spray operation has been completed. The pump is manually-operated by means of the pump handle 21 and its plunger rod 22 carrying a plunger cup at its lower end, as disclosed in my copending application Serial No. 65,403, filed October 27, 1960, now Patent No. 3,091,372.

The novel pressure sealing grommet 13 is conformably but adjustably received in an opening 23 in an embossment or elevated ledge 24 on the head 19 of the tank 10. This resilient grommet, preferably formed of a compounded synthetic rubber, encompasses the flexible discharge tube 12 and provides an effective seal not only about and between it and the encompassed discharge tube, but also provides an effective sealing means between the exterior of the grommet and the bead or flange 25 defining the opening 23 in the embossment 24. Furthermore, this novel sealing grommet provides a simple and effective means for quickly relieving pressure in the tank when spraying has been completed or the tank requires refilling at which time the pump assembly 11 is released and bodily removed to provide access to the fill opening 20, and also provides a simple means for draining any remaining solution from the tank 10 from about the outer periphery of the grommet 13 and between it and the opening 23.

As shown in FIGS. 3 and 4, the novel elongated pressure seal gromet 13 is provided with an internal stepped opening having an enlargement 26, a cylindrical bore 27 having internal serrations 28 adapted to receive intermeshing external serrations 29 on the circumference of the discharge tube or hose 12, and an enlarged bore 30 below these serrations 28. The form of serrations 28 on the internal diameter of the grommet at 27 are shown enlarged in FIG. 6 while the form of serrations 29 on the serrated portion of the discharge tube 12 are shown in FIG. 7.

At its upper end the grommet 13 has an enlargement or collar 31 projecting beyond an annular constriction 32, the collar being provided with spaced depending arcuate projections 33 having their lower end extending toward the bead or flange 25 defining the opening 23 in the embossment 24. From this constriction 32 the exterior of the body 34 of the grommet tapers or slopes outwardly and downwardly to an annular shoulder or ledge 35, and from this shoulder inwardly and downwardly to provide a depending annular flange 36 spaced outwardly from an internal annular tapered sealing lip 37 disposed below the lowermost serration 28 on the internal diameter of the grommet 13. The internal sealing lip 37 and the spaced encompassing flange 36 provide therebetween an annular recess 38 (FIG. 4) open to the air under pressure in the tank whereby the air pressure compresses the sealing lip 37 into tight sealing contact about the encompassed discharge tube 12 and elevates the grommet in the opening 23.

This construction and arrangement (FIG. 4) permits a relatively small amount of air pressure in the tank to lift the grommet 13 in the opening 23 and wedge together into tight sealing contact the intermeshing serrations 29 on the discharge tube 12 with the serrations 28 on the grommet 13 to assure most effective sealing contact between the tube and grommet. Concurrently, lifting of the grommet 13 by the air pressure forces its tapered body 34 upwardly or outwardly into tight sealing contact between the grommet and the bead or edge 25 defining the opening 23 for the grommet.

It will be evident from FIGS. 6 and 7 that the serrations 28 on the cylindrical bore 27 of the resilient grommet 13 (FIG. 6) do not completely conform to the serrations 29 on the plastic discharge tube or hose 12 (FIG. 6) which, while the tube is capable of being bent, its serrations 29 maintain their shape or contour while the serrations 28 of the grommet 13 being resilient readily flex and assume substantially the contour of the serrations 29. Thus when the grommet and the discharge tube are assembled in a pressure tank and the grommet is subjected to air pressure in the tank, positive sealing is effected and maintained between the intermeshing serrations of the grommet 13 and those of the tube 12.

From the above description and disclosure in the drawings, it will be evident that the novel resilient pressure seal grommet is so designed and constructed as to assure positive inner sealing with the plastic hose or discharge tube, and also positive outer sealing between the grommet and the tank. As sealing is influenced by the pressure in the tank, it will be readily appreciated that while but a small amount of tank pressure effects and maintains positive sealing, any increase in pressure enhances inner and outer sealing contact of the resilient grommet.

Pressure in the tank can be quickly relieved simply by depressing the exposed upper end 31 of the grommet against the top of the bead or flange 25 defining the opening 23 in the top of the tank, thereby disengaging the external tapered surface of the grommet from sealing contact with the inner periphery of the bead as shown in FIG. 4, and moving the grommet to the position shown in FIG. 3. In this lowered position of the grommet, pressure in the tank 10 is relieved between the grommet and the bead 25 and between the arcuate projections 33 to the atmosphere. This loose positioning of the grommet 13 when pressure in the tank is relieved, also permits draining through the opening 23 of any liquid remaining in the tank.

Having thus disclosed the invention, I claim:

1. In a pressure sprayer having a tank for a spray solution to be dispensed through an opening in the upper portion of the tank by pressure generated in the tank, a discharge tube projecting through said opening to adjacent the bottom of the tank for discharge of the spray solution, and a resilient pressure seal grommet encompassing said discharge tube and mounted for limited axial movement and reciprocation within said opening, said discharge tube having external spaced serrations intermediate the ends thereof and said grommet having a central passage with internal spaced serrations engaging said serrations on the discharge tube, an enlarged collar on the upper end of said grommet of greater diameter than and disposed above said opening, an annular constriction below said collar of less diameter than said opening, a downwardly and outwardly flared enlargement depending into the interior of the tank below said annular constriction with said flared enlargement having wedging and sealing contact with the portion of the tank defining said opening when the grommet is subjected to air pressure in the tank, and an annular lip at the lower end of the grommet retained in pressure sealing contact with said discharge tube below its external serrations whereby tight sealing engagement between the discharge tube and the grommet is enhanced by pressure in the tank.

2. In a pressure sprayer as set forth in claim 1, in which the serrations on the discharge tube are of greater rigidity than the serrations on the resilient grommet whereby when the discharge tube is forced into the grommet the serrations on the grommet flex and substantially conform to the contour of the serrations on the tube to thereat provide an effective seal between the tube and grommet.

3. In a pressure sprayer as set forth in claim 1, in which the lower end of the grommet has an annular recess defining the depending sealing lip which is open to the pressure in the tank to maintain said lip in sealing contact with the discharge tube.

4. In a pressure sprayer as set forth in claim 1, in which said enlarged collar has a plurality of spaced projections depending from its lower surface, said collar when depressed releasing the grommet from sealing engagement with said tank, relieving pressure therein and preventing resealing of the grommet until pressure is again generated in the tank.

References Cited in the file of this patent

UNITED STATES PATENTS

| | | |
|---|---|---|
| 494,467 | Donathen | Mar. 28, 1893 |
| 1,112,202 | Estes | Sept. 29, 1914 |
| 1,299,371 | Meloon | Apr. 1, 1919 |
| 1,633,458 | Schock | June 21, 1927 |
| 2,048,852 | Dumas | July 28, 1936 |
| 2,062,449 | Dick | Dec. 1, 1936 |
| 2,301,724 | Vischer | Nov. 10, 1942 |
| 2,723,056 | Smith | Nov. 8, 1955 |
| 2,741,405 | Efford et al. | Apr. 10, 1956 |
| 2,748,984 | Seymour | June 5, 1956 |
| 2,766,054 | Everhart | Oct. 9, 1956 |

FOREIGN PATENTS

| | | |
|---|---|---|
| 52,807 | Sweden | Oct. 4, 1922 |
| 637,513 | Germany | Oct. 30, 1936 |
| 765,008 | Great Britain | Jan. 2, 1957 |